US012747099B2

(12) United States Patent
Kinugawa et al.

(10) Patent No.: US 12,747,099 B2
(45) Date of Patent: Sep. 29, 2026

(54) TRANSPORT VEHICLE

(71) Applicants: Daifuku Co., Ltd., Osaka (JP); Taiwan Daifuku Co., Ltd., Tainan-city (TW)

(72) Inventors: Tomotaka Kinugawa, Hinocho (JP); Kiyohide Ichino, Tainan-city (TW)

(73) Assignee: Daifuku Co., Ltd., Osaka (JP)

( * ) Notice: Subject to any disclaimer, the term of this patent is extended or adjusted under 35 U.S.C. 154(b) by 429 days.

(21) Appl. No.: 18/234,534

(22) Filed: Aug. 16, 2023

(65) Prior Publication Data

US 2024/0059486 A1 Feb. 22, 2024

(30) Foreign Application Priority Data

Aug. 19, 2022 (JP) ................................ 2022-131019

(51) Int. Cl.
*B65G 1/04* (2006.01)

(52) U.S. Cl.
CPC .................................. *B65G 1/0464* (2013.01)

(58) Field of Classification Search
CPC ................ B65G 1/0464; B65G 1/0457; B65G 2201/0297; B65G 2203/042
See application file for complete search history.

(56) References Cited

U.S. PATENT DOCUMENTS

| | | | | |
|---|---|---|---|---|
| 11,485,577 | B1 * | 11/2022 | Hoshino | B65G 47/902 |
| 11,518,022 | B1 * | 12/2022 | Pajevic | B65G 43/08 |
| 2005/0011851 | A1 | 1/2005 | Ikeya | |
| 2021/0284443 | A1 * | 9/2021 | Hamaguchi | B65G 1/0464 |
| 2021/0299704 | A1 * | 9/2021 | Bell | B07C 3/02 |
| 2021/0337734 | A1 * | 11/2021 | Jeanty | B25J 9/04 |
| 2022/0024690 | A1 * | 1/2022 | Abe | H01L 21/67733 |
| 2022/0063928 | A1 * | 3/2022 | Christen | B65G 17/345 |
| 2022/0380125 | A1 * | 12/2022 | Wada | H01L 21/67736 |
| 2023/0140218 | A1 | 5/2023 | Kobayashi | |
| 2024/0217740 | A1 * | 7/2024 | Heggebø | B65G 1/0464 |

FOREIGN PATENT DOCUMENTS

| | | | |
|---|---|---|---|
| JP | 6453927 | A | 3/1989 |
| JP | 200535770 | A | 2/2005 |
| JP | 200564130 | A | 3/2005 |
| WO | 2021181924 | A1 | 9/2021 |

* cited by examiner

*Primary Examiner* — Saul Rodriguez
*Assistant Examiner* — Ashley K Romano
(74) *Attorney, Agent, or Firm* — The Webb Law Firm

(57) ABSTRACT

A transport vehicle includes a first sensor that detects a relative distance in a vertical direction between a holder and at least one handle contactlessly. A controller determines, based on a detection result from the first sensor, whether the relative distance is at a first set value as a reference for the holder to hold or release the at least one handle and whether the relative distance is at a second set value corresponding to a descending limit for the holder with respect to the at least one handle.

10 Claims, 8 Drawing Sheets

Fig.10

Load determination

| | First sensor | Second sensor | Determination results |
|---|---|---|---|
| Case1 | ○ | ○ | Present |
| Case2 | × | ○ | — |
| Case3 | ○ | × | — |
| Case4 | × | × | — |

○ : First detection state
× : Other state

Fig.11

Descending limit determination

| | First sensor | Second sensor | Determination results |
|---|---|---|---|
| Case5 | ○ | ○ | Descending limit |
| Case6 | × | ○ | Descending limit |
| Case7 | ○ | × | Descending limit |
| Case8 | × | × | — |

○ : Second detection state
× : Other state

TRANSPORT VEHICLE

CROSS-REFERENCE TO RELATED APPLICATION

This application claims priority to Japanese Patent Application No. 2022-131019 filed Aug. 19, 2022, the disclosure of which is hereby incorporated by reference in its entirety.

BACKGROUND OF THE INVENTION

Field of the Invention

The present invention relates to a transport vehicle that travels along a travel path to transport an article and includes a compartment to accommodate the article, a holder to hold handles included in the article, and a lifter to lift and lower the holder between the compartment and a transfer area below the travel path.

Description of Related Art

An example of such a transport vehicle is described in Japanese Unexamined Patent Application Publication No. 2005-064130 (Patent Literature 1). Reference signs in parentheses used below in describing the background are the reference signs in Patent Literature 1.

The transport vehicle (1) described in Patent Literature 1 holds a flange (53) in a container (51) with a holder assembly (32) to transfer the container (51). The transport vehicle (1) includes a flange detection sensor (55) including a light emitter (55a) that emits light in the horizontal direction and a light receiver (55b) that receives the light. The flange detection sensor (55) detects the position of the flange (53) in the container (51).

To receive the container (51) on a mount (60), the transport vehicle (1) lowers a holder assembly (32) holding no object toward the container (51) on the mount (60). While lowering the holder assembly (32), the transport vehicle (1) detects the position of the flange (53) based on the flange (53) blocking light from the flange detection sensor (55).

As described above, with the technique described in Patent Literature 1, the holder assembly (32) lifts and lowers, and the flange detection sensor (55) emits light in the horizontal direction and receives light to detect a target based on light being blocked, and thus simply detects a single point. Thus, the technique described in Patent Literature 1 cannot appropriately monitor the positional relationship between the holder assembly (32) and the container (51) during a transfer operation.

SUMMARY OF THE INVENTION

In response to the above, transport vehicles are to appropriately monitor the positional relationship between a holder and an article during a transfer operation.

A transport vehicle for traveling along a travel path to transport an article includes a compartment that accommodates the article, a holder that holds at least one handle included in the article, a lifter that lifts and lowers the holder between the compartment and a transfer area below the travel path, a controller that controls the holder and the lifter, and a first sensor that detects a relative distance in a vertical direction between the holder and the at least one handle contactlessly. The controller determines, based on a detection result from the first sensor, whether the relative distance is at a first set value as a reference for the holder to hold or release the at least one handle and whether the relative distance is at a second set value corresponding to a descending limit for the holder with respect to the at least one handle.

The transport vehicle with this structure includes the first sensor that detects the vertical relative distance between the holder and the handle contactlessly and can easily and continuously monitor the positional relationship between the holder and the handle during a transfer operation. The relative distance detected by the first sensor reaching the first set value allows the holder to hold or release the handle. The relative distance reaching the second set value allows determination that the holder is located at a descending limit with respect to the handle. Thus, the transport vehicle with this structure can appropriately monitor the positional relationship between the holder and the article during the transfer operation.

Further features and advantageous effects of the technique according to the present disclosure will be apparent from exemplary and nonlimiting embodiments described below with reference to the drawings.

BRIEF DESCRIPTION OF THE DRAWINGS

FIG. 10 is a table showing load determination.

FIG. 11 is a table showing descending limit determination.

DESCRIPTION OF THE INVENTION

A transport vehicle travels along a travel path to transport an article. A transport vehicle according to one or more embodiments will now be described. The transport vehicle is used in a transport facility in one or more embodiments.

Figure 1:
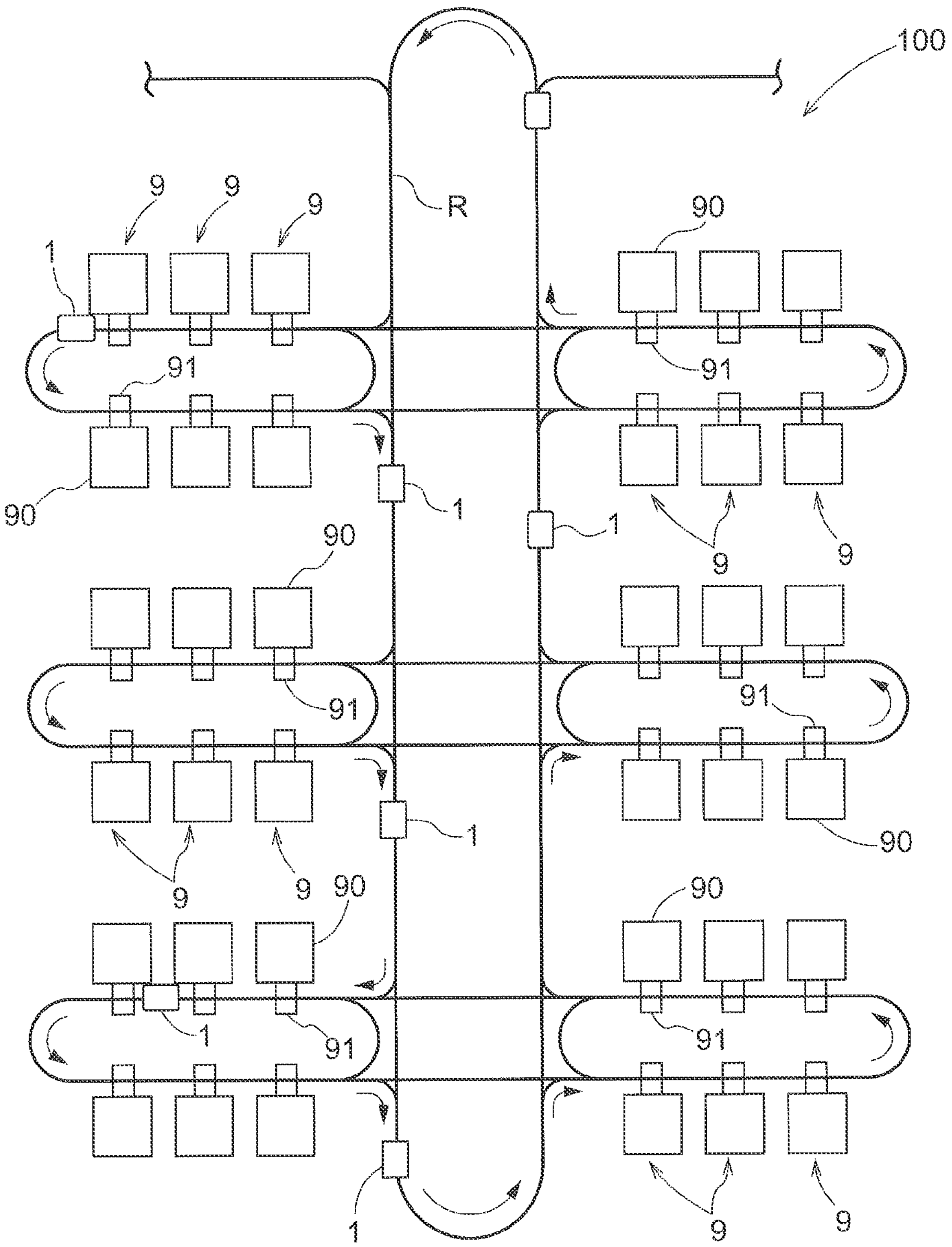
FIG. 1 is a plan view of a transport facility.
Figure 2:
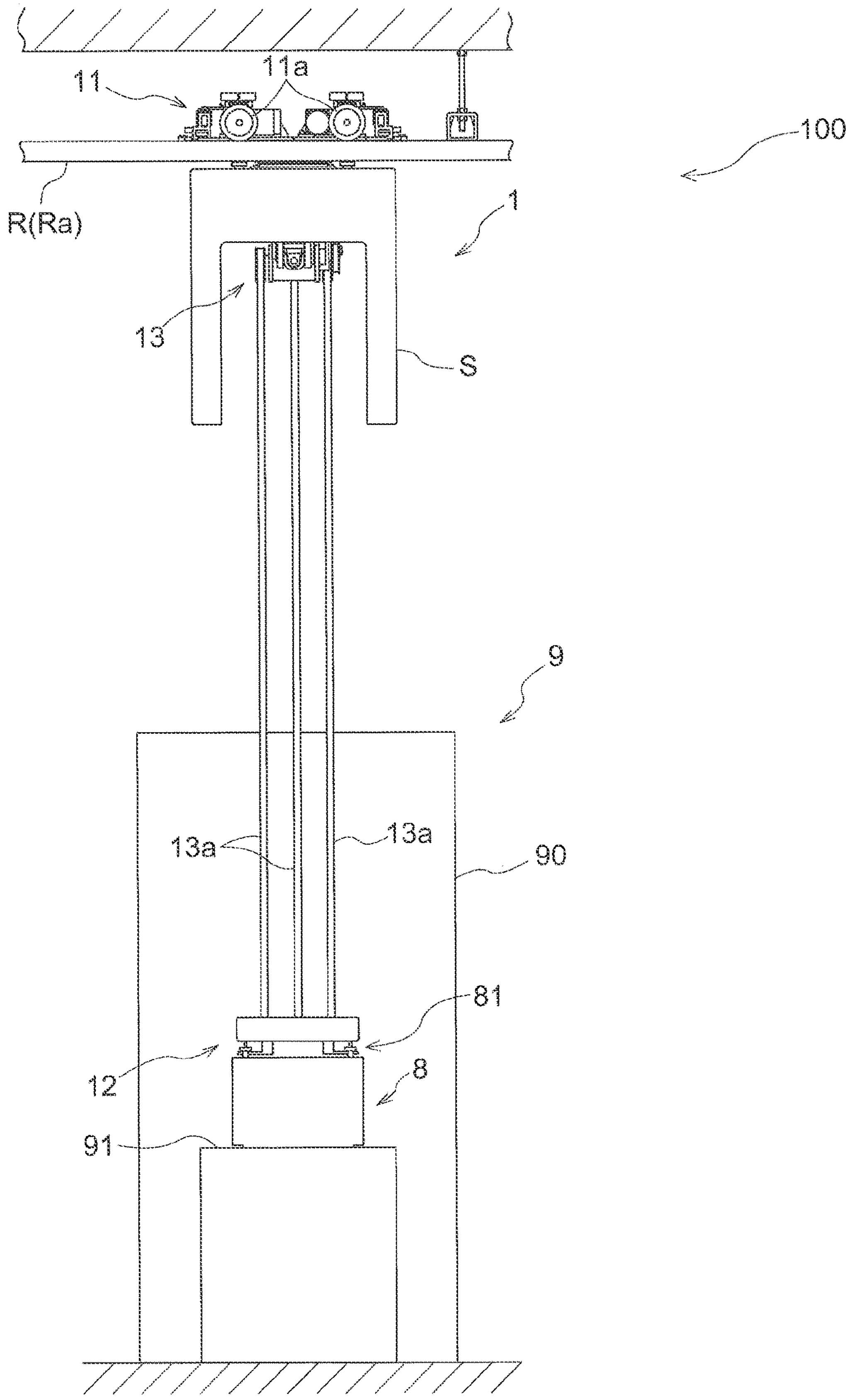
FIG. 2 is a diagram describing a transfer operation.

As shown in FIGS. 1 and 2, a transport facility 100 includes a predefined travel path R, one or more transport vehicles 1 that each travel on the travel path R to transport an article 8, and multiple transfer areas 9 defined along the travel path R.

The travel path R is spaced upward from the floor surface. In the present embodiment, the travel path R includes a rail Ra installed near the ceiling. The transport vehicle 1 is installed on the ceiling to travel along the rail Ra. The transfer areas 9 are located below the travel path R. The transport vehicle 1 lifts and lowers the article 8 and transfers the article 8 to and from the transfer areas 9.

In the present embodiment, the transport facility 100 includes multiple transport vehicles 1. Each of the multiple transport vehicles 1 performs, in response to a transport command provided from a host controller (not shown) that centrally manages the facility, a task corresponding to the transport command. For example, the transport command includes information about a transfer source and a transfer destination of an article 8. A transport vehicle 1 receives such a transport command and transports an article 8 from its transfer source to its transfer destination. The transfer source and the transfer destination include transfer areas 9.

The transport facility 100 handles various articles 8. In the present embodiment, the transport facility 100 is used in a semiconductor fabrication plant. The articles 8 are thus, for example, substrate containers (front opening unified pods, or FOUPs) accommodating substrates (e.g., wafers and panels) or reticle containers (reticle pods) accommodating reticles. In this case, the transport vehicles 1 transport, between processes, the articles 8 such as substrate containers or reticle containers along the travel path R.

In the present embodiment, each transfer area 9 includes a processor 90 that processes an article 8 and a mount 91 adjacent to the processor 90. Processing an article 8 herein refers to processing objects (substrates or reticles) accommodated in the article 8 as a container. Each transport vehicle 1 receives an article 8 that has been processed by a processor 90 from a mount 91 or delivers an article 8 that has yet to be processed by a processor 90 to a mount 91. The processors 90 perform various processes such as thin film formation, photolithography, and etching.

As shown in FIG. 2, each transport vehicle 1 includes a traveler 11 that travels on the rail Ra. Each transport vehicle 1 also includes a compartment S to accommodate an article 8, a holder 12 to hold handles 81 in the article 8, a lifter 13 to lift and lower the holder 12 between the compartment S and a transfer area 9 below the travel path R, and a controller C (refer to FIG. 5) to control the holder 12 and the lifter 13. The controller C also controls the traveler 11.

In the present embodiment, the traveler 11 includes multiple travel wheels 11*a* that roll on the rail Ra and a travel wheel driver 11*m* (refer to FIG. 5) that drives at least one or more of the travel wheels 11*a*. For example, the travel wheel driver 11*m* is an electric motor.

In the present embodiment, the compartment S is hung from the traveler 11 below the rail Ra. The compartment S can accommodate an article 8 held by the holder 12. With the compartment S accommodating an article 8, the transport vehicle 1 transports the article 8 along the travel path R.

In the present embodiment, the lifter 13 includes belts 13*a* connected to the holder 12 and a belt driver 13*m* (refer to FIG. 5) that drives the belts 13*a*. Although not illustrated in detail, the belt driver 13*m* includes a rotator around which the belts 13*a* are wound and a drive source that rotates the rotator. The rotor rotates in the forward direction or in the reverse direction to wind or unwind the belts 13*a*. This causes the holder 12 connected to the belts 13*a* to be lifted and lowered.

In the present embodiment, the holder 12 includes multiple holding parts 12*b* and a holding part driver 12*m* (refer to FIG. 5) that drives the holding parts 12*b*. For example, the holding part driver 12*m* includes an electric motor. The holder 12 will be described in detail later.

The articles 8 will now be described. As described above, the articles 8 are containers for accommodating objects.

Figure 3:
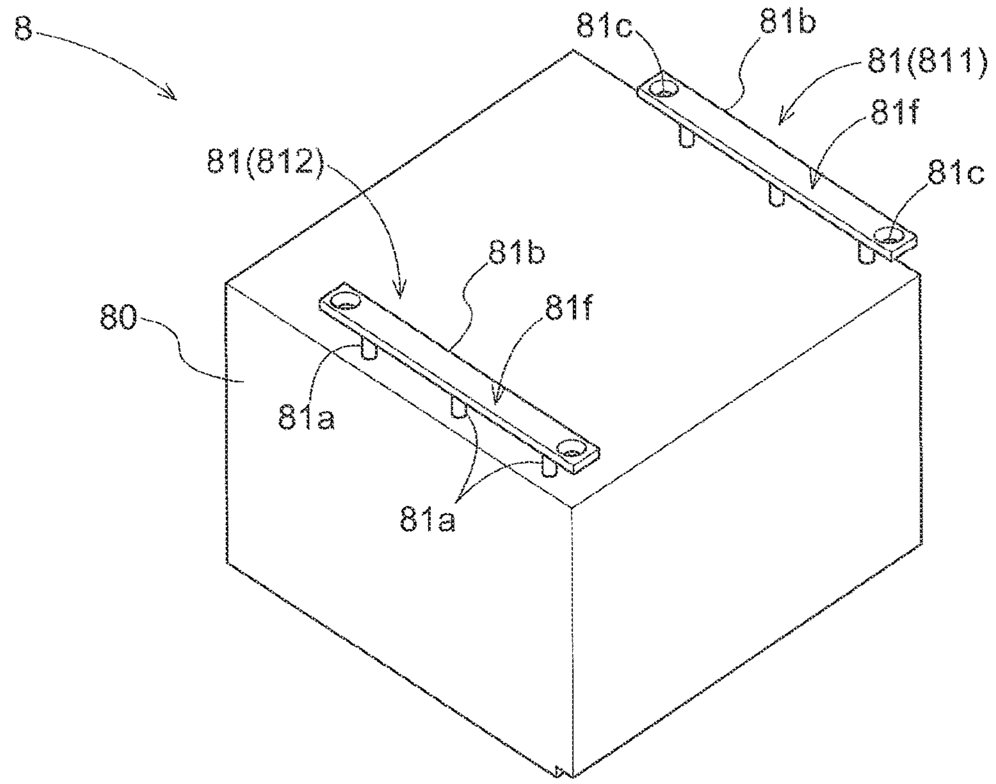
FIG. 3 is a perspective view of an article.

As shown in FIG. 3, each article 8 includes a body 80 and handles 81. The body 80 is a box for accommodating objects. The handles 81 are held by the holder 12 in a transport vehicle 1.

In the present embodiment, the handles 81 are a pair of handles that protrude upward from the upper surface of a body 80. Each of the handles 81 in a pair includes multiple poles 81*a* extending from the upper surface of the body 80, and a plate 81*b* connecting the upper ends of the poles 81*a*.

The multiple poles 81*a* included in each handle 81 are spaced from each other. In the illustrated example, three poles 81*a* are at equal intervals. As described in detail later, the multiple poles 81*a* are at intervals between which the holding parts 12*b* in the holder 12 can pass.

The plates 81*b* are elongated in a direction in which the poles 81*a* are arranged. Each plate 81*b* has a plate surface 81*f* facing upward. The plate surface 81*f* is flat. Each plate 81*b* has recesses 81*c* recessed downward from the plate surface 81*f*. Each plate 81*b* has multiple (two in the illustrated example) recesses 81*c*. As described in detail later, each recess 81*c* receives a positioner 12*c* included in a holder 12 when the holder 12 holds the handles 81.

The pair of handles 81 hereafter are a first handle 811 and a second handle 812. The first handle 811 and the second handle 812 are simply and collectively referred to as the handles 81 without being distinguished from each other.

The structure of the holder 12 will now be described in detail. The holder 12 can hold the pair of handles 81 described above.

Figure 4:
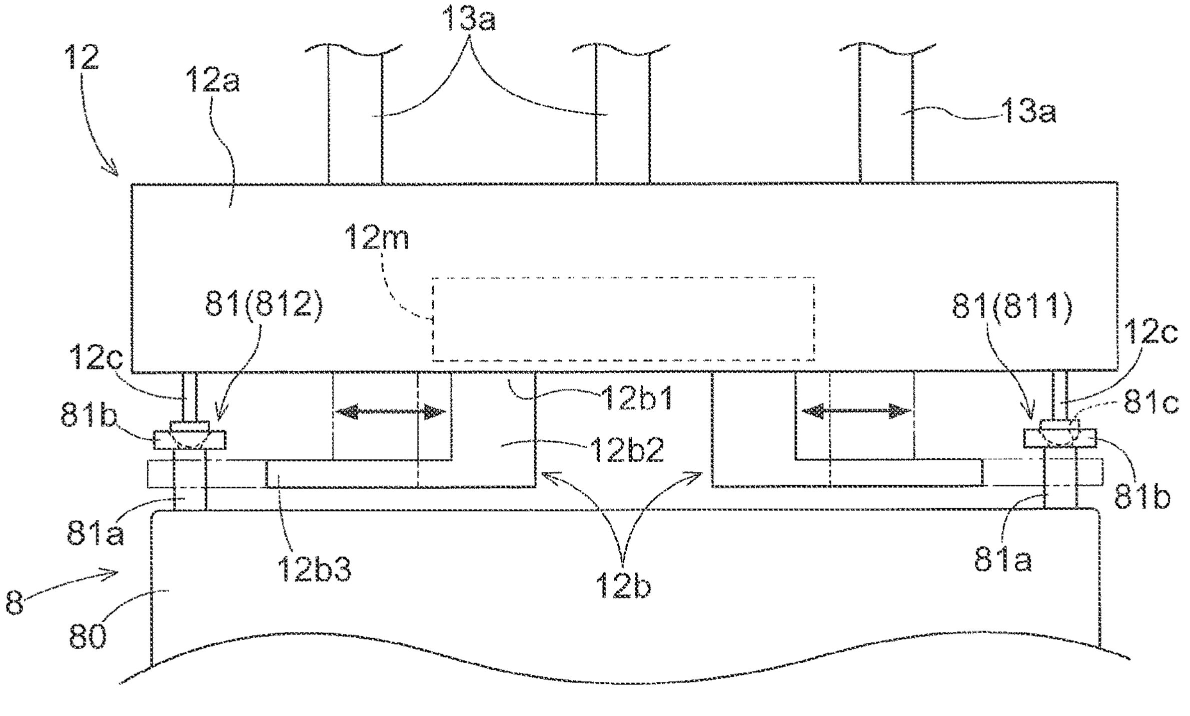
FIG. 4 is a diagram describing a holding operation.

In the present embodiment, as shown in FIG. 4, the holder 12 includes a holder body 12*a*, the holding parts 12*b*, and positioners 12*c*. The belts 13*a* described above are connected to the holder body 12*a*.

Each holding part 12*b* includes a supported portion 12*b*1 that is supported by the holder body 12*a*, a base 12*b*2 extending downward from the supported portion 12*b*1, and an extension 12*b*3 extending outward from the base 12*b*2 in the horizontal direction. In the present embodiment, each holding part 12*b* has a substantially L shape in a side view.

The holding parts 12*b* include multiple pairs of holding parts 12*b* that operate to approach and separate from each other in the horizontal direction. In the present embodiment, the holding parts 12*b* separate from each other between the pair of handles 81 to hold the pair of handles 81 from inside the pair of handles 81 in the horizontal direction. At this time, the extension 12*b*3 in each holding part 12*b* passes between adjacent two of the poles 81*a* to be placed to face the plate 81*b* from below. When the entire holder 12 is lifted in this state, the support of the article 8 shifts from a mount 91 (refer to FIG. 2) to the holder 12, and the extension 12*b*3 in each holding part 12*b* lifts the plate 81*b* from below. Conversely, when the entire holder 12 is lowered in the state in which the extension 12*b*3 in each holding part 12*b* lifts the plate 81*b*, the support of the article 8 shifts from the holder 12 to the mount 91 (refer to FIG. 2), and the extension 12*b*3 in each holding part 12*b* is spaced downward from the plate 81*b*.

In the present embodiment, when the extensions 12*b*3 are located above the body 80 and below the plates 81*b* as shown in FIG. 4, the holder 12 can hold or release the handles 81. More specifically, when the pair of holding parts 12*b* are operated to separate from each other with the extensions 12*b*3 located at the above height, the holder 12 holds the handles 81. In contrast, when the pair of holding parts 12*b* are operated to approach each other, the holder 12 releases the handles 81. The operations of each holding part 12*b* are performed by the holding part driver 12*m* installed in the holder body 12*a*.

In the present embodiment, the multiple positioners 12*c* protrude downward from the holder body 12*a*. The multiple positioners 12*c* are at positions corresponding to the recesses 81*c* on the handles 81 included in an article 8. With the holder 12 holding the handles 81, each of the multiple positioners 12*c* at least fits into the corresponding recess 81*c*. When the transport vehicle 1 receives an article 8 placed on a mount 91, each of the multiple positioners 12*c* fits into the corresponding recess 81*c* as the holder 12 is lowered toward the mount 91. In other words, each of the multiple positioners 12*c* fits into the corresponding recess

81*c* before the holder 12 holds the handles 81. This positions the holding parts 12*b* appropriately with respect to the handles 81. The holding parts 12*b* are then operated to hold the handles 81 appropriately.

Figure 5:
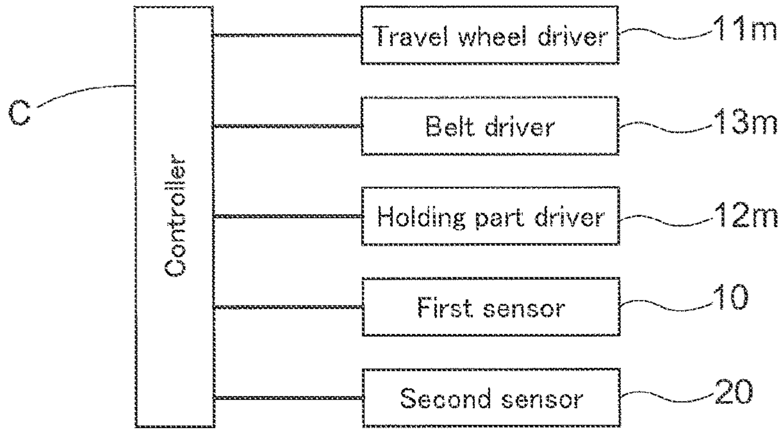
FIG. 5 is a control block diagram.

The components in the transport vehicle 1, or more specifically, the traveler 11, the lifter 13, and the holder 12, are controlled by the controller C. In the present embodiment, as shown in FIG. 5, the controller C controls a travel wheel driver 11*m*, the belt driver 13*m*, and the holding part driver 12*m*. The controller C includes, for example, a processor such as a microcomputer, and peripheral circuitry including a memory. The hardware and programs executed on a processor such as a computer cooperate with each other to perform processes or functions.

As described above, the transport vehicle 1 lifts and lowers the holder 12 to transfer the article 8 between the holder 12 and a transfer area 9 below the travel path R. In particular, to receive the article 8 in a transfer area 9, the transport vehicle 1 is to lower the holder 12 toward the article 8 down to the position at which the holder 12 can hold the article 8. Thus, to perform a transfer operation (particularly, reception), the transport vehicle 1 is to monitor the distance between the holder 12 and the article 8.

Figure 6:
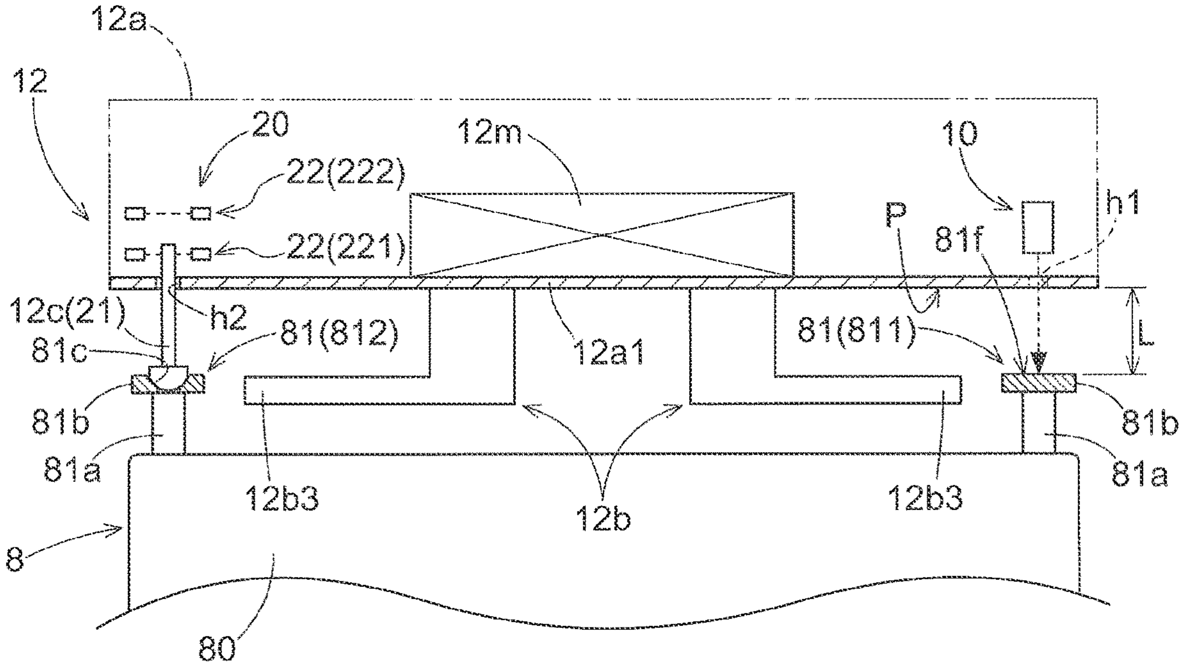
FIG. 6 is a diagram of a first sensor and a second sensor.

As shown in FIG. 6, the transport vehicle 1 includes a first sensor 10 that detects a vertical relative distance L between the holder 12 and a handle 81 in the article 8 contactlessly. In the present embodiment, the first sensor 10 emits light downward. In the present embodiment, the first sensor 10 includes an optical distance sensor.

In the present embodiment, the first sensor 10 is accommodated in the holder body 12*a*. The holder body 12*a* has a hole h1 at its bottom 12*a*1. The hole h1 is open inside and outside the holder body 12*a*. The first sensor 10 emits light toward the hole h1 from inside the holder body 12*a*. Light through the hole h1 is emitted further downward.

In the present embodiment, the first sensor 10 emits light toward the handle 81 in the article 8 during the transfer operation or while the holder 12 is holding the article 8. More specifically, the first sensor 10 emits light toward the plate surface 81*f* of the plate 81*b* in the handle 81 through the hole h1. The plate surface 81*f* is a large part of the plate 81*b* and is flat. Any displacement in the light emitted by the first sensor 10 in the horizontal direction is thus less likely to affect the detection of the relative distance L between the holder 12 and the handle 81.

In the present embodiment, the relative distance L is a distance from a reference position P set at the holder 12 to the plate surface 81*f* of the handle 81. In the present embodiment, the reference position P is set at the bottom 12*a*1 of the holder body 12*a*.

In the present embodiment, the first sensor 10 detects the relative distance L for at least one handle in the pair of handles 81 in the article 8. In the present embodiment, the first sensor 10 detects the relative distance L for one handle alone in the pair of handles 81, or more specifically, a first handle 811.

In the present embodiment, the transport vehicle 1 includes a second sensor 20 in addition to the first sensor 10. The second sensor 20 detects the vertical relative distance L between the holder 12 and a handle 81. More specifically, the second sensor 20 has the same use as the first sensor 10. The second sensor 20 detects the relative distance L for one handle alone in the pair of handles 81 in the article 8, or more specifically, a second handle 812.

The second sensor 20 has a different structure from the first sensor 10. In the present embodiment, the second sensor 20 detects the relative distance L for the second handle 812, and includes a contactor 21 that changes its state by coming in contact with the second handle 812, and a state detector 22 that detects a change in the state of the contactor 21.

In the present embodiment, the contactor 21 vertically extends through the bottom 12*a*1 of the holder body 12*a*. The bottom 12*a*1 has a through-hole h2 that is open inside and outside the holder body 12*a* and receives the contactor 21.

The contactor 21 received in the through-hole h2 vertically slides with respect to the bottom 12*a*1 through physical contact with a target. More specifically, the second handle 812 comes in contact with the contactor 21 from below to lift the contactor 21. Thus, the contactor 21 slides through the through-hole h2 to be pushed into the holder body 12*a*.

In response to the lifting being released by the second handle 812, the contactor 21 returns to its original position. In the present embodiment, at least one of the multiple positioners 12*c* serves as the contactor 21.

In the present embodiment, the state detector 22 includes a light emitter and a light receiver, and detects the state of the contactor 21 based on blocking of the optical axis. In the present embodiment, the state detector 22 is installed in the holder body 12*a*. The state detector 22 detects the state of the contactor 21 based on the distance by which the contactor 21 protrudes into the holder body 12*a*. When the contactor 21 protrudes into the holder body 12*a* by a predetermined distance, the contactor 21 blocks the optical axis of the state detector 22. With this blocking, the state detector 22 can detect the distance by which the contactor 21 is pushed in by the second handle 812, or more specifically, the relative distance L between the holder 12 and the handle 81.

In the present embodiment, the state detector 22 includes a first detector 221 and a second detector 222. The first detector 221 is located below the second detector 222. The first detector 221 detects the contactor 21 being pushed in by the second handle 812 and protruding into the holder body 12*a* by a relatively small distance. The second detector 222 is located above the first detector 221. The second detector 222 detects the contactor 21 being pushed in by the second handle 812 and protruding into the holder body 12*a* by a relatively large distance.

Figure 7:
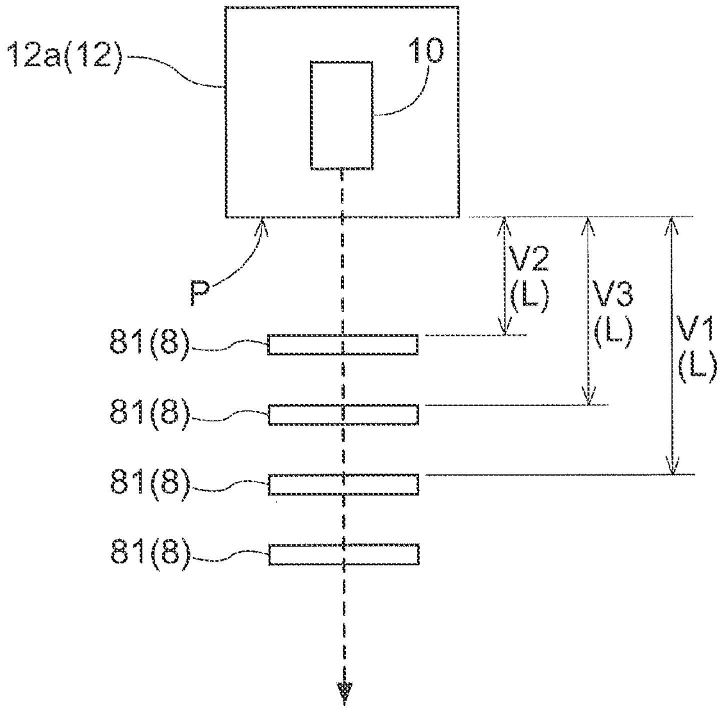
FIG. 7 is a diagram describing the relationship between relative distances and set values.

Subsequently, the relative distance L detected by the first sensor 10 and the second sensor 20 is described. FIG. 7 schematically shows the vertical relative distance L between the holder 12 and the handle 81. The relative distance L changes with the lifting and lowering operation of the holder 12. FIG. 7 shows the holder 12 being lowered toward the article 8 in one transfer area 9 stepwise (FIG. 7 apparently shows the handle 81 approaching the holder 12). Although the first sensor 10 detects the relative distance L in the example illustrated in FIG. 7, the second sensor 20 detects the relative distance L similarly.

In the present embodiment, multiple values are set for the relative distance L. More specifically, the relative distance L has a first set value V1 as a reference for the holder 12 to either hold or release the handle 81, and a second set value V2 corresponding to the descending limit for the holder 12 with respect to the handle 81. The first set value V1 serves as a reference to determine whether any article 8 is placed in a transfer area 9, or more specifically, to determine a load. The second set value V2 serves as the limit to which the holder 12 can be lowered when any article 8 is placed in a transfer area 9, or in other words, a reference to determine the descending limit for the holder 12. Each of the first set value V1 and the second set value V2 is not a predetermined single value, and includes multiple values within a predetermined range.

The first set value V1 is greater than the second set value V2. In other words, the relative distance L is longer at the first set value V1 than at the second set value V2. More specifically, when the holder 12 is lowered toward the article 8 in a transfer area 9, the relative distance L reaches the first set value V1 earlier than the second set value V2. In the state shown in FIG. 6, or more specifically, when the extensions 12*b*3 in the holding parts 12*b* are located at the same height as the plates 81*b* in the handles 81, the relative distance L is at the first set value V1. In the state in FIG. 4 in which the holder 12 is lower than in this state, or more specifically, in the state in which the extensions 12*b*3 in the holding parts 12*b* are located above the body 80 and below the plates 81*b*, the holder 12 can hold or release the handles 81. A first detection state referred to below occurs when the first sensor 10 detects the relative distance L as being at the first set value V1. Similarly, a first detection state referred to below occurs when the second sensor 20 detects the relative distance Las being at the first set value V1.

The second set value V2 is smaller than the first set value V1. In other words, the relative distance L is shorter at the second set value V2 than at the first set value V1. More specifically, when the holder 12 is lowered toward the article 8 in a transfer area 9, the relative distance L reaches the first set value V1 and then the second set value V2. In the state in which the holder 12 is further lowered than in the state in FIG. 4, or more specifically, when the extensions 12*b*3 in the holding parts 12*b* are adjacent to the body 80 with a slight gap in between (or in contact with the body 80), the holder 12 is located at the descending limit.

A second detection state referred to below occurs when the first sensor 10 detects the relative distance L as being at the second set value V2. Similarly, a second detection state occurs when the second sensor 20 detects the relative distance L as being at the second set value V2.

In the present embodiment, a third set value is set between the first set value V1 and the second set value V2. The third set value is set as the relative distance L at which the holder 12 holds or releases the handles 81. In the present embodiment, when the relative distance L is at the third set value V3, the extensions 12*b*3 in the holding parts 12*b* are located above the body 80 and below the plates 81*b*, and the holder 12 can hold or release the handles 81 (refer to FIG. 4). The third set value V3 is not a predetermined single value, and includes multiple values within a predetermined range.

The controller C obtains detection results from the first sensor 10 and the second sensor 20 (refer to FIG. 5). Based on the detection results from the first sensor 10, the controller C determines whether the relative distance L (the relative distance L for the first handle 811 in this case) is at the first set value V1 as a reference for the holder 12 to either hold or release the handles 81 and whether the relative distance L is at the second set value V2 corresponding to the descending limit for the holder 12 with respect to the handles 81. Based on the detection results from the second sensor 20, the controller C also determines whether the relative distance L for the second handle 812 is at the first set value V1 and whether the relative distance L for the second handle 812 is at the second set value V2. To lower the holder 12 toward the article 8 in a transfer area 9, when the relative distance L reaches the first set value V1, the controller C further lowers the holder 12 by a set distance to change the relative distance L toward the third set value V3.

Figure 8:
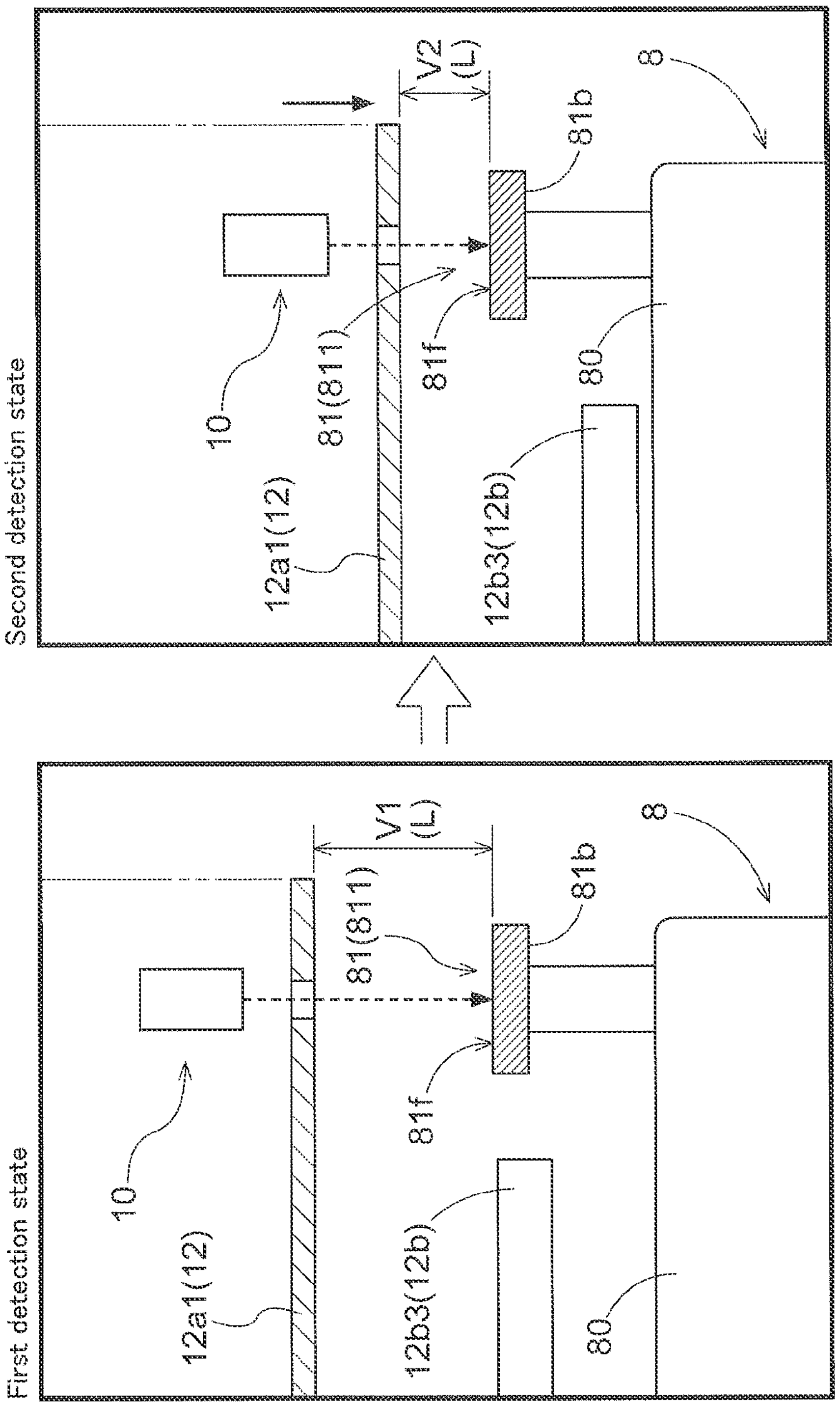
FIG. 8 is a diagram of the first sensor, showing its structure.

As shown in FIG. 8, when the holder 12 is lowered toward the article 8 in a transfer area 9, the first sensor 10 first detects the relative distance L as being at the first set value V1 and enters the first detection state. The relative distance L at the first set value V1 (the first sensor 10 in the first detection state) is used as a reference to determine whether the article 8 is located in the transfer area 9, or in other words, to determine a load. When the relative distance L is at the first set value V1, the extensions 12*b*3 in the holding parts 12*b* are located at the same height as the plates 81*b* in the handles 81.

When the holder 12 is further lowered toward the article 8 in the transfer area 9, the first sensor 10 detects the relative distance L as being at the second set value V2 and enters the second detection state. The relative distance L at the second set value V2 (the first sensor 10 in the second detection state) is used as a reference to determine whether the holder 12 is at the descending limit. When the relative distance L is at the second set value V2, the extensions 12*b*3 in the holding parts 12*b* are adjacent to the body 80 with a slight gap in between (or in contact with the body 80).

In the present embodiment, the first sensor 10 is enabled when at least the holder 12 holds the handles 81 or the holder 12 is outside the compartment S (refer to FIG. 2), and is disabled when the holder 12 does not hold the handles 81 and is in the compartment S. The first sensor 10 being enabled indicates the first sensor 10 emitting light. The first sensor 10 being disabled indicates the first sensor 10 emitting no light.

When the holder 12 holds the handles 81, the first sensor 10 is enabled, and thus can easily detect, for example, the handles 81 slipping from the holder 12. When the holder 12 is outside the compartment S, the first sensor 10 is enabled. Thus, the holder 12 outside the compartment S can be easily monitored not to interfere with another object (the article 8 or obstacles). When the holder 12 does not hold the handles 81 and is in the compartment S, the handles 81 do not slip off and the holder 12 does not interfere with other objects as described above. Thus, the first sensor 10 is not to be enabled. In the present embodiment, the first sensor 10 is disabled in the above case to reduce power consumption.

Figure 9:
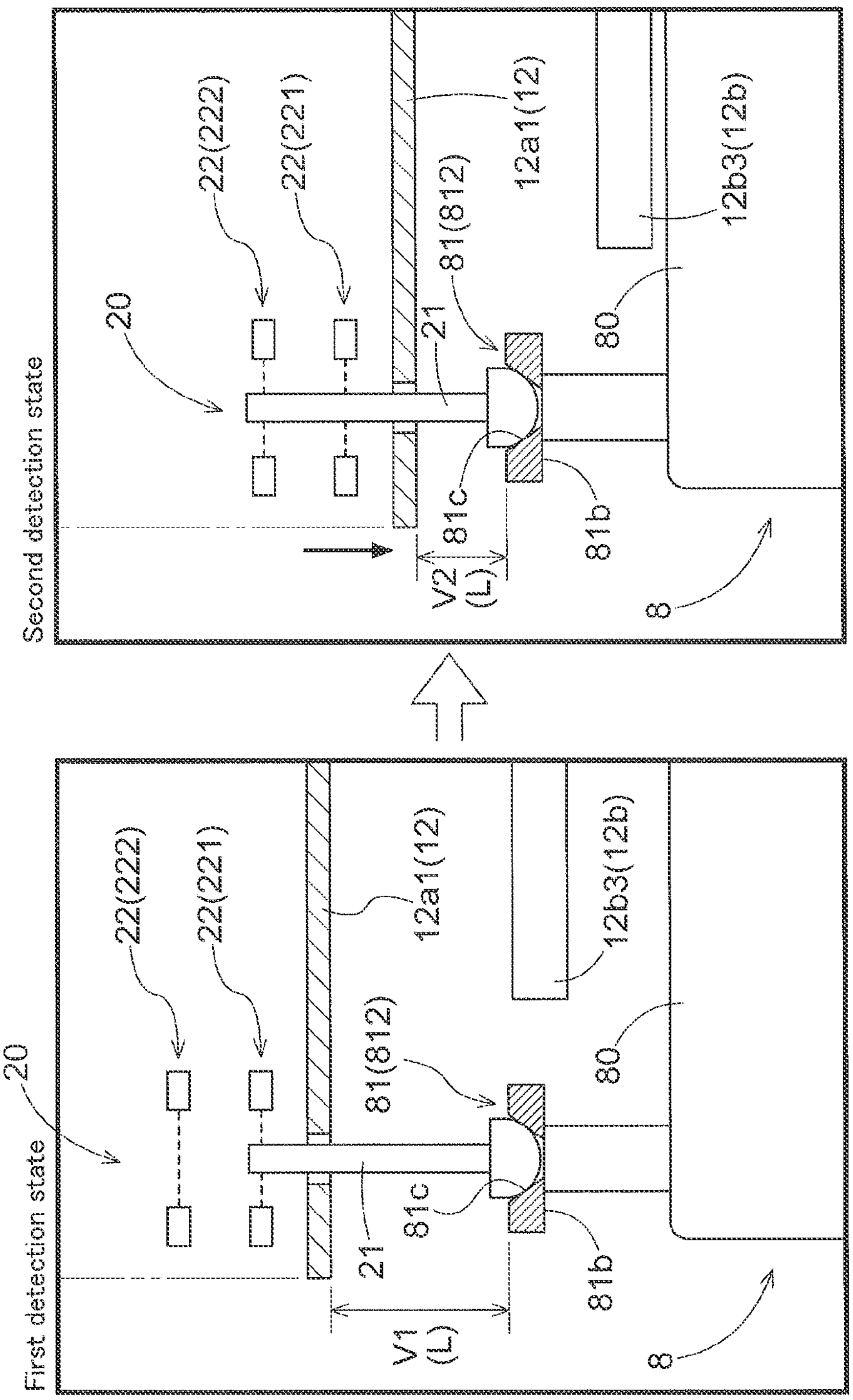
FIG. 9 is a diagram of the second sensor, showing its structure.

As shown in FIG. 9, when the holder 12 is lowered toward the article 8 in a transfer area 9, the second sensor 20 first detects the relative distance L as being at the first set value V1 and enters the first detection state. In the present embodiment, the contactor 21 blocks the optical axis of the first detector 221, and the second sensor 20 enters the first detection state. The relative distance L at the first set value V1 (the second sensor 20 in the first detection state) is used as a reference to determine whether the article 8 is located in the transfer area 9, or more specifically, to determine a load. When the relative distance L is at the first set value V1, the extensions 12*b*3 in the holding parts 12*b* are located at the same height as the plates 81*b* in the handles 81.

When the holder 12 is further lowered toward the article 8 in the transfer area 9, the second sensor 20 detects the relative distance L as being at the second set value V2 and enters the second detection state. In the present embodiment, the contactor 21 blocks the optical axis of the second detector 222, and the second sensor 20 enters the second detection state. The relative distance L at the second set value V2 (the second sensor 20 in the second detection state) is used as a reference to determine whether the holder 12 is located at the descending limit. When the relative distance L is at the second set value V2, the extensions 12*b*3 in the holding parts 12*b* are adjacent to the body 80 with a slight gap in between (or in contact with the body 80).

As described above, the structure according to the present embodiment includes the first sensor 10 and the second sensor 20 having different structures. The first sensor 10 that detects the relative distance L between the holder 12 and the handle 81 in the article 8 without coming in contact with the handles 81, and the second sensor 20 that detects the relative distance L between the holder 12 and the handle 81 while coming in contact with the handles 81 perform detection on substantially different objects (more specifically, the first handle 811 and the second handle 812) with different methods. Thus, the first sensor 10 and the second sensor 20 may cause detection errors from different causes. For example, the contactless first sensor 10 may be broken to degrade its sensitivity. The contact second sensor 20 may detect an erroneous relative distance L when the holder 12 is displaced in the horizontal direction and the contactor 21 fails to appropriately fit to the recess 81*c* on the handle 81. In the present embodiment, these two sensors with different features are used for the load determination of the article 8 and the descending limit determination for the holder 12.

FIG. 10 shows the conditions for the load determination of the article 8 or used to determine whether any article 8 is placed in a transfer area 9.

In the present embodiment, the controller C determines the relative distance L as being at the first set value V1 when two conditions are both satisfied, or namely, when the first sensor 10 detects the relative distance L as being at the first set value V1 and the second sensor 20 detects the relative distance Las being at the first set value V1. More specifically, as shown in FIG. 10, the controller C determines the relative distance L as being at the first set value V1 (the load as being present in the present embodiment) when the two conditions are both satisfied, or namely, when the first sensor 10 is in the first detection state and the second sensor 20 is in the first detection state. In this manner, the controller C determines the relative distance L between the holder 12 and the handle 81 as being at the first set value V1 using the detection results from both the first sensor 10 and the second sensor 20. The controller C can thus highly accurately determine the first set value V1.

FIG. 10 shows cases 1 to 4. In case 1, the first sensor 10 and the second sensor 20 are both in the first detection state. In this case, the controller C determines a load as being present.

More specifically, the controller C determines the relative distance L as being at the first set value V1. When at least the first sensor 10 or the second sensor 20 is not in the first detection state, or in cases 2, 3, and 4 in FIG. 10, the controller C does not determine a load as being present. More specifically, the controller C does not determine the relative distance L as being at the first set value V1.

FIG. 11 shows the conditions used to determine the descending limit for the holder 12.

In the present embodiment, the controller C determines the relative distance L as being at the second set value V2 when at least one of two conditions is satisfied, or namely, when at least the first sensor 10 detects the relative distance L as being at the second set value V2 or the second sensor 20 detects the relative distance L as being at the second set value V2. More specifically, as shown in FIG. 11, the controller C determines the relative distance L as being at the second set value V2 (the holder 12 as being at the descending limit in the present embodiment) when at least one of the first sensor 10 or the second sensor 20 is in the second detection state. In this manner, the controller C determines the relative distance L between the holder 12 and the handle 81 as being at the second set value V2 based on the detection results from at least one of the first sensor 10 or the second sensor 20. More specifically, the controller C determines the relative distance L between the holder 12 and the handle 81 as being at the second set value V2 although no detection results are obtained from either the first sensor 10 or the second sensor 20. For determining the relative distance L between the holder 12 and the handle 81 as being at the second set value V2 (more specifically, the holder 12 as being at the descending limit) based on the detection results obtained from both the first sensor 10 and the second sensor 20, the holder 12 remains lowered until the detection results are obtained from the two sensors although, for example, either the first sensor 10 or the second sensor 20 is broken and operates abnormally. When the holder 12 that is actually at the descending limit unintentionally remains lowered, the holder 12 may interfere with the transfer area 9 or the article 8. However, the above structure determines the relative distance L between the holder 12 and the handle 81 as being at the second set value V2 when detection results are obtained from at least one of the first sensor 10 or the second sensor 20, and can thus avoid such unintentional lowering of the holder 12 and more easily avoid interference of the holder 12 with, for example, the transfer area 9.

FIG. 11 shows cases 5 to 8. In cases 5, 6, and 7, at least one of the first sensor 10 or the second sensor 20 is in the second detection state. In these cases, the controller C determines the holder 12 as being at the descending limit. More specifically, the controller C determines the relative distance L as being at the second set value V2. In contrast, when neither the first sensor 10 nor the second sensor 20 is in the second detection state, or in case 8 in FIG. 11, the controller C does not determine the holder 12 as being at the descending limit. More specifically, the controller C does not determine the relative distance L as being at the second set value V2.

Other Embodiments

A transport vehicle according to other embodiments will now be described.

(1) In the above embodiment, the first sensor 10 detects the relative distance L for one handle alone in the pair of handles 81. In some embodiments, the first sensor 10 may detect the relative distance L for the two handles 81. This structure may eliminate the second sensor 20.

(2) In the above embodiment, the controller C determines the relative distance L as being at the first set value V1 when the two conditions are both satisfied, or namely, when the first sensor 10 detects the relative distance L as being at the first set value V1 and the second sensor 20 detects the relative distance L as being at the first set value V1. In some embodiments, the determination may be based on a different condition. More specifically, the controller C may determine the relative distance L as being at the first set value V1 when at least one of the two conditions is satisfied, or namely, when at least the first sensor 10 detects the relative distance L as being at the first set value V1 or the second sensor 20 detects the relative distance L as being at the first set value V1.

(3) In the above embodiment, the controller C determines the relative distance L as being at the second set value V2 when at least one of the two conditions is satisfied, or namely, when at least the first sensor 10 detects the relative distance L as being at the second set value V2 or the second sensor 20 detects the relative distance L as being at the second set value V2. In some embodiments, the determination may be based on an absolute condition that both these conditions are satisfied. More specifically, the controller C may determine the relative distance L as being at the second set value V2 simply when the two conditions are both satisfied, or namely, when the first sensor 10 detects the relative distance L as being at the second set value V2 and the second sensor 20 detects the relative distance L as being at the second set value V2.

(4) In the above embodiment, the first sensor 10 is disabled when the holder 12 does not hold the handles 81 and is in the compartment S. In some embodiments, the first sensor 10 may be basically enabled. More specifically, in the above case, the first sensor 10 may be enabled although the holder 12 does not hold the handles 81 and is in the compartment S.

(5) In the above embodiment, the article 8 includes the pair of handles 81. In some embodiments, the article 8 may include one or three or more handles 81.

(6) In the above embodiment, the holding parts 12*b* separate from each other between the pair of handles 81 to hold the pair of handles 81 from inside the pair of handles 81 in the horizontal direction. In some embodiments, the holding parts 12*b* may hold the pair of handles 81 from outside the pair of handles 81 in the horizontal direction. In this case, the holding parts 12*b* approach each other with the pair of handles 81 located inward from the holding parts 12*b* in the horizontal direction to hold the pair of handles 81 from outside the pair of handles 81 in the horizontal direction.

(7) In the above embodiment, the first sensor 10 includes the optical distance sensor. In some embodiments, the first sensor 10 may include a sensor with another structure. For example, the first sensor 10 may include another contactless sensor such as an ultrasonic distance sensor or a radio-wave distance sensor.

(8) In the above embodiment, the holder 12 includes the positioners 12*c* (two positioners 12*c* in the illustrated example) that fit into the corresponding recesses 81*c* on the first handle 811 and the positioners 12*c* (two positioners 12*c* in the illustrated example) that fit into the corresponding recesses 81*c* on the second handle 812. In some embodiments, the holder 12 may include the positioners 12*c* that fit into the recesses 81*c* on the second handle 812 alone.

(9) The structure described in each of the above embodiments may be combined with any other structures described in the other embodiments unless any contradiction arises. The embodiments described herein are merely illustrative in all respects and may be modified variously as appropriate without departing from the spirit and scope of the present disclosure.

Overview of Embodiments

Hereafter, the transport vehicle will be described.

A transport vehicle for traveling along a travel path to transport an article includes a compartment that accommodates the article, a holder that holds at least one handle included in the article, a lifter that lifts and lowers the holder between the compartment and a transfer area below the travel path, a controller that controls the holder and the lifter, and a first sensor that detects a relative distance in a vertical direction between the holder and the at least one handle contactlessly. The controller determines, based on a detection result from the first sensor, whether the relative distance is at a first set value as a reference for the holder to hold or release the at least one handle and whether the relative distance is at a second set value corresponding to a descending limit for the holder with respect to the at least one handle.

In this structure, the first sensor detects the vertical relative distance between the holder and the handle contactlessly, and thus easily and continuously monitors the positional relationship between the holder and the handle during a transfer operation. The relative distance detected by the first sensor reaching the first set value allows the holder to hold or release the handle. The relative distance reaching the second set value allows determination that the holder is located at the descending limit with respect to the handle. Thus, this structure can appropriately monitor the positional relationship between the holder and the article during the transfer operation.

A third set value being the relative distance as a reference for the holder to hold or release the at least one handle may be set between the first set value and the second set value.

In this structure, the relative distance between the holder and the handle reaching the third set value allows the holder to appropriately hold or release the handle.

The at least one handle may be a pair of handles protruding upward from an upper surface of a body of the article. The first sensor may detect the relative distance for at least one handle in the pair of handles.

In this structure, the relative distance between the holder and the handle can be appropriately detected when the article includes a pair of handles.

The transport vehicle may further include a second sensor in addition to the first sensor. The pair of handles may include a first handle and a second handle. The first sensor may detect the relative distance for the first handle. The second sensor may detect the relative distance for the second handle. The second sensor may include a contactor and a state detector. The contactor may change a state when coming in contact with the second handle. The state detector may detect a change in the state of the contactor. The controller may determine, based on a detection result from the second sensor, whether the relative distance for the second handle is at the first set value and whether the relative distance for the second handle is at the second set value.

In this structure, the controller determines, based on the detection results from both the first and second sensors with different structures, whether the relative distance between the holder and the handle is at the first set value and whether the relative distance between the holder and the handle(s) is at the second set value. This structure thus easily performs highly accurate determination.

The controller may determine the relative distance as being at the first set value when two conditions that the first sensor detects the relative distance as being at the first set value and that the second sensor detects the relative distance as being at the first set value are satisfied, and determine the relative distance as being at the second set value when at least one of two conditions that the first sensor detects the relative distance as being at the second set value and that the second sensor detects the relative distance as being at the second set value is satisfied.

This structure determines the relative distance between the holder and the handle as being at the first set value based on the detection results from both the first and second sensors. This structure can thus highly accurately determine the first set value. This structure determines the relative distance between the holder and the handle as being at the second set value based on the detection results from at least one of the first or second sensor. More specifically, when the detection results from either of the sensors are not obtained, this structure determines the relative distance between the holder and the handle as being at the second set value. For determining the relative distance between the holder and the handle as being at the second set value (more specifically, the holder as being at the descending limit) based on the detection results obtained from both the first and second sensors, the holder remains lowered until the detection results from the two sensors are obtained although, for example, either the first sensor or the second sensor is broken and operates abnormally. When the holder that is actually at the descending limit unintentionally remains lowered, the holder may interfere with the transfer area or the article. However, the above structure determines the relative distance between the holder and the handle as being at the second set value when detection results from at least one of the first or second sensor are obtained, and can thus avoid such unintentional lowering of the holder and more easily avoid interference of the holder with, for example, the transfer area.

The first sensor may be enabled when at least the holder holds the at least one handle or the holder is outside the compartment, and may be disabled when the holder does not hold the at least one handle and is in the compartment.

This structure allows easy determination that the holder is holding the handles and easy monitoring of the relative distance between the holder and the handle during lifting and lowering of the holder based on the detection results from the first sensor. When detection with the first sensor is not to be performed, the first sensor is disabled to reduce power consumption.

INDUSTRIAL APPLICABILITY

The technique according to the embodiments of the present disclosure is applicable to a transport vehicle that travels along a travel path to transport an article and includes a compartment to accommodate the article, a holder to hold handles included in the article, and a lifter to lift and lower the holder between the compartment and a transfer area below the travel path.

What is claimed is:

1. A transport vehicle for traveling along a travel path to transport an article, the transport vehicle comprising:
 - a compartment configured to accommodate the article;
 - a holder configured to hold at least one handle included in the article;
 - a lifter configured to lift and lower the holder between the compartment and a transfer area below the travel path;
 - a controller configured to control the holder and the lifter;
 - a first sensor configured to detect a relative distance in a vertical direction between the holder and the at least one handle contactlessly; and
 - a second sensor in addition to the first sensor,
 - wherein the controller determines, based on a detection result from the first sensor, whether the relative distance is at a first set value as a reference for the holder to hold or release the at least one handle and whether the relative distance is at a second set value corresponding to a descending limit for the holder with respect to the at least one handle,
 - wherein the second sensor is separated from the first sensor in a horizontal direction and is configured to detect the relative distance while coming in contact with the handle, and
 - wherein the controller further determines, based on a detection result from the second sensor, whether the relative distance is at the first set value and whether the relative distance is at the second set value.

2. The transport vehicle according to claim 1, wherein:
 - a third set value is the relative distance as a reference for the holder to hold or release the at least one handle is set between the first set value and the second set value.

3. The transport vehicle according to claim 2, wherein:
 - to lower the holder toward the article in a transfer area, when the relative distance reaches the first set value, the controller further lowers the holder by a set distance to change the relative distance toward the third set value.

4. The transport vehicle according to claim 1, wherein:
 - the at least one handle is a pair of handles protruding upward from an upper surface of a body of the article,
 - the first sensor detects the relative distance for at least one handle in the pair of handles.

5. The transport vehicle according to claim 1, wherein:
 - the controller determines the relative distance is at the first set value when two conditions that the first sensor detects the relative distance is at the first set value and that the second sensor detects the relative distance is at the first set value are satisfied, and
 - determines the relative distance is at the second set value when at least one of two conditions that the first sensor detects the relative distance is at the second set value and that the second sensor detects the relative distance is at the second set value is satisfied.

6. The transport vehicle according to claim 1, wherein:
 - the first sensor is enabled when at least the holder holds the at least one handle or the holder is outside the compartment, and is disabled when the holder does not hold the at least one handle and is in the compartment.

7. The transport vehicle according to claim 1, wherein:
 - the first set value is set to a distance that serves as a reference to determine whether any article is placed in the transfer area.

8. The transport vehicle according to claim 1, wherein:
 - the second set value is set to a distance serving as a reference to determine a descending limit for the holder when the article is placed in a transfer area, and
 - the relative distance is longer at the first set value than at the second set value.

9. A transport vehicle for traveling along a travel path to transport an article, the transport vehicle comprising:
 - a compartment configured to accommodate the article;
 - a holder configured to hold at least one handle included in the article;
 - a lifter configured to lift and lower the holder between the compartment and a transfer area below the travel path;
 - a controller configured to control the holder and the lifter;
 - a first sensor configured to detect a relative distance in a vertical direction between the holder and the at least one handle contactlessly; and
 - a second sensor in addition to the first sensor,
 - wherein the controller determines, based on a detection result from the first sensor, whether the relative distance is at a first set value as a reference for the holder to hold or release the at least one handle and whether the relative distance is at a second set value corresponding to a descending limit for the holder with respect to the at least one handle,
 - wherein the at least one handle is a pair of handles protruding upward from an upper surface of a body of the article,
 - wherein the first sensor detects the relative distance for at least one handle in the pair of handles,
 - wherein the pair of handles comprise a first handle and a second handle,
 - wherein the first sensor detects the relative distance for the first handle, wherein the second sensor detects the relative distance for the second handle, the second sensor comprises a contactor and a state detector, the contactor changes a state when coming in contact with the second handle, and the state detector detects a change in the state of the contactor, and wherein the controller determines, based on a detection result from the second sensor, whether the relative distance for the second handle is at the first set value and whether the relative distance for the second handle is at the second set value.

10. A transport vehicle for traveling along a travel path to transport an article, the transport vehicle comprising:

a compartment configured to accommodate the article;

a holder configured to hold at least one handle included in the article;

a lifter configured to lift and lower the holder between the compartment and a transfer area below the travel path;

a controller configured to control the holder and the lifter; and a first sensor configured to detect a relative distance in a vertical direction between the holder and the at least one handle contactlessly, wherein the controller determines, based on a detection result from the first sensor, whether the relative distance is at a first set value as a reference for the holder to hold or release the at least one handle and whether the relative distance is at a second set value corresponding to a descending limit for the holder with respect to the at least one handle, wherein a third set value is the relative distance as a reference for the holder to hold or release the at least one handle is set between the first set value and the second set value, and wherein to lower the holder toward the article in a transfer area, when the relative distance reaches the first set value, the controller further lowers the holder by a set distance to change the relative distance toward the third set value.

* * * * *